(12) United States Patent
Nishida et al.

(10) Patent No.: US 10,906,599 B2
(45) Date of Patent: Feb. 2, 2021

(54) VEHICLE-BODY SIDE FACE STRUCTURE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Issei Yasuda, Hiroshima (JP); Masaru Chikita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 96 days.

(21) Appl. No.: 16/362,183

(22) Filed: Mar. 22, 2019

(65) Prior Publication Data

US 2019/0291791 A1    Sep. 26, 2019

(30) Foreign Application Priority Data

Mar. 23, 2018  (JP) ................................ 2018-056448

(51) Int. Cl.
*B62D 37/02* (2006.01)
*B62D 35/02* (2006.01)
*B62D 35/00* (2006.01)

(52) U.S. Cl.
CPC ........... *B62D 37/02* (2013.01); *B62D 35/008* (2013.01); *B62D 35/02* (2013.01)

(58) Field of Classification Search
CPC ....... B62D 37/02; B62D 35/008; B62D 35/02
USPC .................. 296/180.1, 209, 181.5
See application file for complete search history.

(56) References Cited

U.S. PATENT DOCUMENTS

| 7,144,075 B2 * | 12/2006 | Shishikura | .............. B60R 13/04 296/209 |
| 8,083,285 B2 * | 12/2011 | Yanagida | ........... B62D 25/2036 296/181.5 |
| 2016/0214662 A1 | 7/2016 | Emura | |

FOREIGN PATENT DOCUMENTS

| GB | 2463742 A | 3/2010 |
| JP | S59-174969 U | 11/1984 |
| JP | 2004-106585 A | 4/2004 |
| JP | 2017-074905 A | 4/2017 |
| WO | 2015-034022 A1 | 3/2015 |
| WO | 2015-072543 A1 | 5/2015 |

OTHER PUBLICATIONS

The extended European search report issued by the European Patent Office dated Jul. 30, 2019, which corresponds to European Patent Application No. 19163410.4-1013 and is related to U.S. Appl. No. 16/362,183.

* cited by examiner

*Primary Examiner* — Joseph D. Pape
*Assistant Examiner* — Dana D Ivey
(74) *Attorney, Agent, or Firm* — Studebaker & Brackett PC (57) ABSTRACT

A garnish is provided with a protrusion portion which protrudes outwardly, in a vehicle width direction, so as to suppress a side-face airflow flowing below a door maximum-width portion of a side portion of a cabin from going around below a vehicle floor. A plate-shaped tire deflector is provided at a lower end portion of a front edge of a rear wheel house which corresponds to a position, in a vertical direction, of a rear end portion of the protrusion portion, wherein the tire deflector is configured to deflect a side-face airflow flowing above the protrusion portion such that the side-face airflow is turned toward an outward side, in the (Continued)

vehicle width direction, so as not to flow into the rear wheel house and adheres to a tire-wheel outer face.

12 Claims, 8 Drawing Sheets

VEHICLE-BODY SIDE FACE STRUCTURE

BACKGROUND OF THE INVENTION

The present invention relates to a vehicle-body side face structure, in particular, relates to the vehicle-body side face structure which comprises a side sill extending in a vehicle longitudinal direction at a lower portion of a cabin at a position located between a lower end portion of a rear edge of a front wheel house and a lower end portion of a front edge of a rear wheel house and a garnish provided to cover the side sill over a range from the front wheel house to the rear wheel house.

In general, a vehicle is configured such that a width, in a vehicle width direction, of a beltline portion of each of a pair of right-and-left side doors is set to be the maximum and the width of the other part of the side door becomes smaller toward a downward side of the side door.

Herein, it has been found that this structure has a problem in that a side-face airflow (traveling air) flowing below the above-described door maximum-width portion (beltline portion) is so drawn into a high-speed airflow flowing down below a vehicle floor that this side-face airflow goes around a side sill and below the vehicle floor, so that the airflow below the vehicle floor is disturbed improperly.

Then, it has been found that in a case where a protrusion portion which is configured to protrude outwardly in the vehicle width direction is provided at the side sill, the side-face airflow is suppressed from going around below the vehicle floor, but this side-face airflow is deflected upwardly and becomes so strong that it flows into the rear wheel house, so that a vehicle rear airflow is disturbed improperly.

Meanwhile, Japanese Patent Laid-Open Publication No. 2004-106585 discloses a rear-tire deflector which comprises a first plate which is positioned below a side sill inner and a side sill outer and a second plate which is positioned above the first plate and below the side sill inner. However, this patent document does not disclose any technical idea nor structure for controlling the side face airflow flowing along a vehicle-body side face.

SUMMARY OF THE INVENTION

Accordingly, an object of the present invention is to provide a vehicle-body side face structure which can properly suppress the side-face airflow flowing below the door maximum-width portion of a side portion of a cabin from going around below the vehicle floor and also suppress a situation where this side-face airflow is deflected upwardly and becomes so strong that it flows into the rear wheel house, thereby reducing disturbance of the vehicle rear airflow properly.

The present invention is a vehicle-body side face structure, comprising a side sill extending in a vehicle longitudinal direction at a lower portion of a cabin at a position located between a lower end portion of a rear edge of a front wheel house and a lower end portion of a front edge of a rear wheel house, and a garnish provided to cover the side sill over a range from the front wheel house to the rear wheel house, wherein the garnish is provided with a protrusion portion which protrudes outwardly, in a vehicle width direction, so as to suppress a side-face airflow flowing below a door maximum-width portion of a side portion of the cabin from going around below a vehicle floor, and a plate-shaped tire deflector is provided at the lower end portion of the front edge of the rear wheel house which corresponds to a position, in a vertical direction, of a rear end portion of the protrusion portion of the garnish, the tire deflector being configured to deflect a side-face airflow flowing above the protrusion portion such that the side-face airflow is turned toward an outward side, in the vehicle width direction, so as not to flow into the rear wheel house and adheres to an outer face of a tire wheel of a rear wheel.

According to the present invention, the side-face airflow flowing below the door maximum-width portion of the side portion of the cabin can be properly suppressed from going around below the vehicle floor by means of the above-described protrusion portion, and also the situation where the above-described side-face airflow is deflected upwardly and becomes so strong that it flows into the rear wheel house can be properly suppressed by means of the above-described tire deflector, thereby reducing disturbance of the vehicle rear airflow properly.

In an embodiment of the present invention, the garnish comprises a vertical face portion which extends in the vehicle longitudinal direction along a lower portion of a door and an outer face of the side sill and a protruding face portion which protrudes outwardly, in the vehicle width direction, of the vertical face portion and forms an upper face of the protrusion portion, an outward end, in the vehicle width direction, of the protruding face portion is configured to be linear over a range from the lower end portion of the rear edge of the front wheel house and to the lower end portion of the front edge of the rear wheel house, and an inward end, in the vehicle width direction, of the protruding face portion and the vertical face portion are configured to be curved such that respective middle portions, in the vehicle longitudinal direction, thereof are curved inwardly, in the vehicle width direction, so as to correspond to a shape of the lower portion of the door.

According to this embodiment, the side-face airflow flowing below the door maximum-width portion can be properly suppressed from going around below the vehicle floor by means of the protruding face portion forming the upper face of the protrusion portion, thereby properly securing the airflow straightening effect, and also the vehicle design quality can be properly secured by the curved shapes of the inward end of the protruding face portion and the vertical face portion.

In another embodiment of the present invention, the tire deflector includes a plate-shaped portion which is configured to extend downwardly from a lower face of the side sill, the plate-shaped portion is inclined such that an outward end, in the vehicle width direction, thereof is positioned on a rearward side, in the vehicle longitudinal direction, of an inward end, in the vehicle width direction, thereof.

According to this embodiment, since the plate-shaped portion of the tire deflector is arranged in a so-called rearwardly-inclined state, the side-face airflow can be made to adhere to the outer face of the tire wheel securely.

In another embodiment of the present invention, the tire deflector is configured to abut with and be fixed to a rear end face of the garnish.

According to this embodiment, the assembling quality of the tire deflector to the garnish can be properly improved.

Other features, aspects, and advantages of the present invention will become apparent from the following description which refers to the accompanying drawings.

DETAILED DESCRIPTION OF THE INVENTION

Hereafter, an embodiment of the present invention will be specifically described referring to the drawings.

Figure 1:
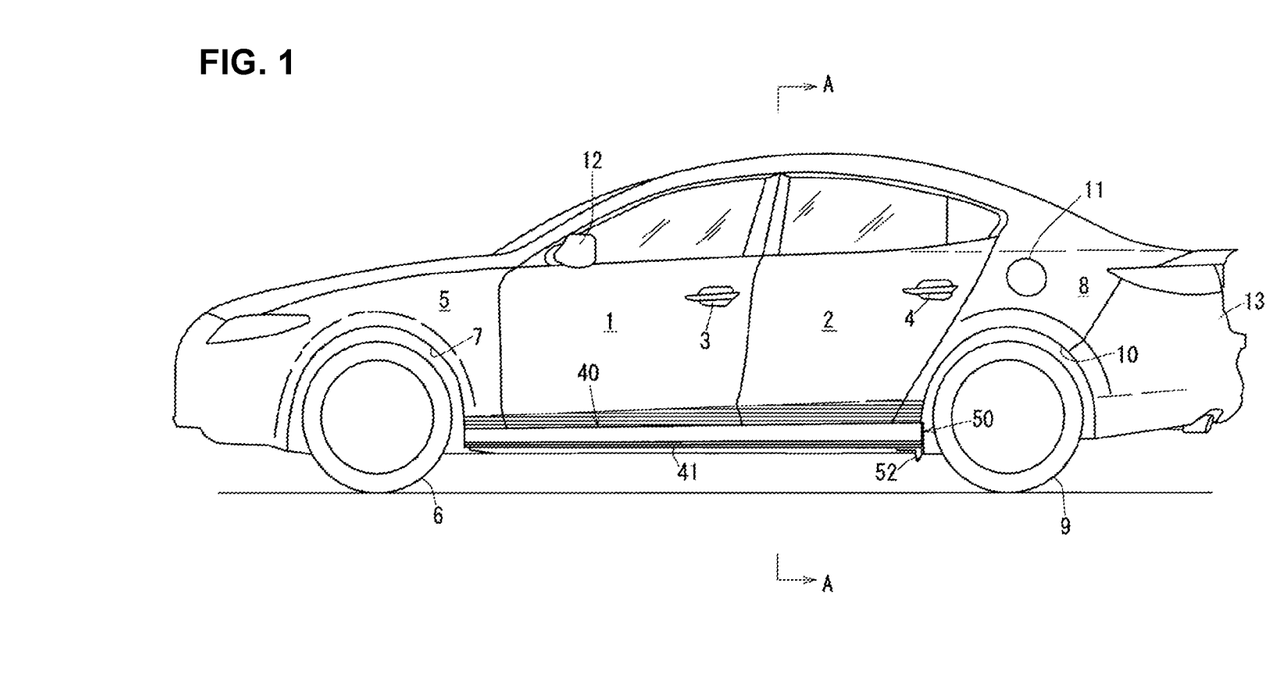
FIG. 1 is a side view of a vehicle having a vehicle-body side face structure of the present invention.
Figure 3:
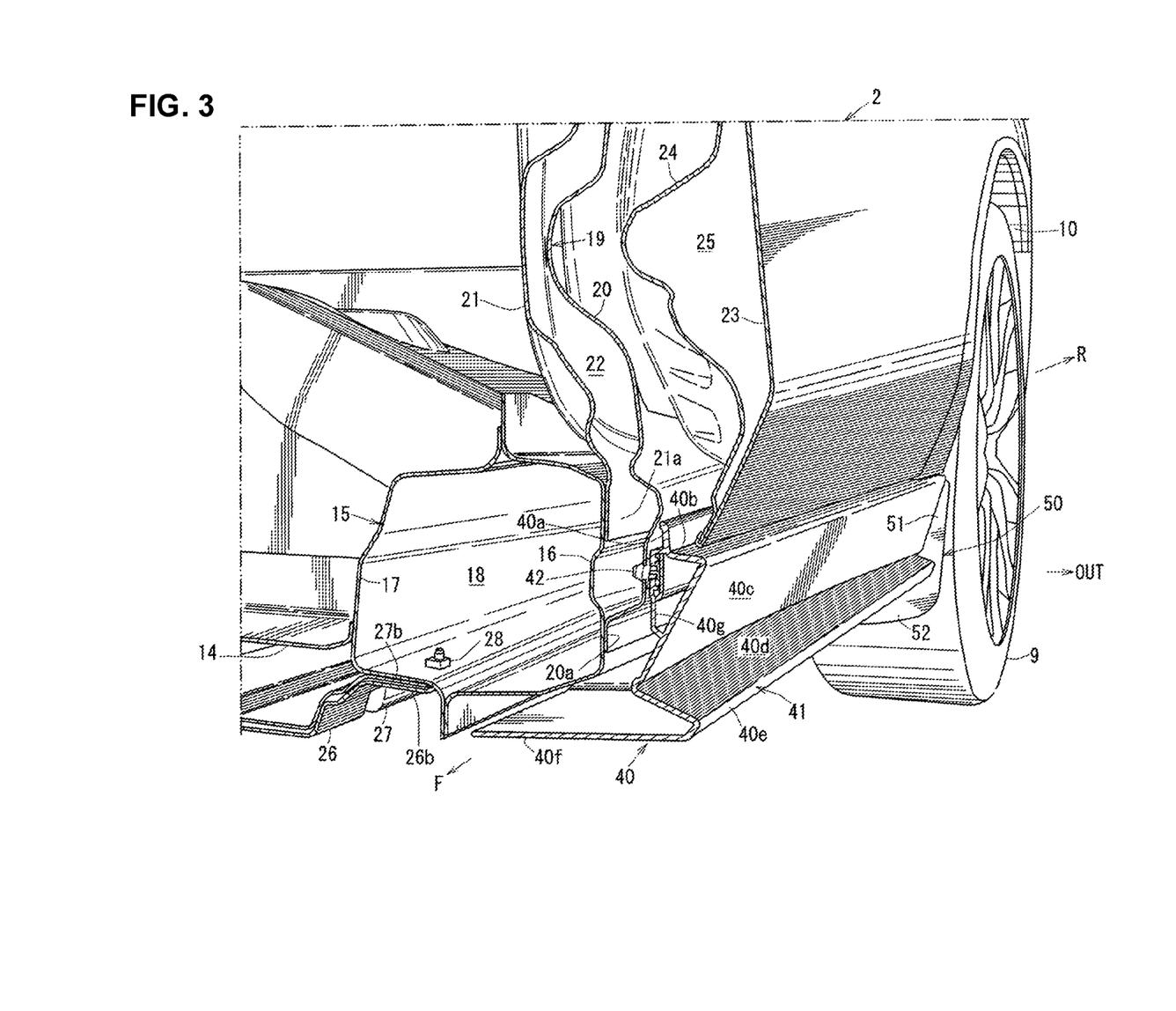
FIG. 3 is a sectional perspective view taken along line A-A of FIG. 1.
Figure 4:
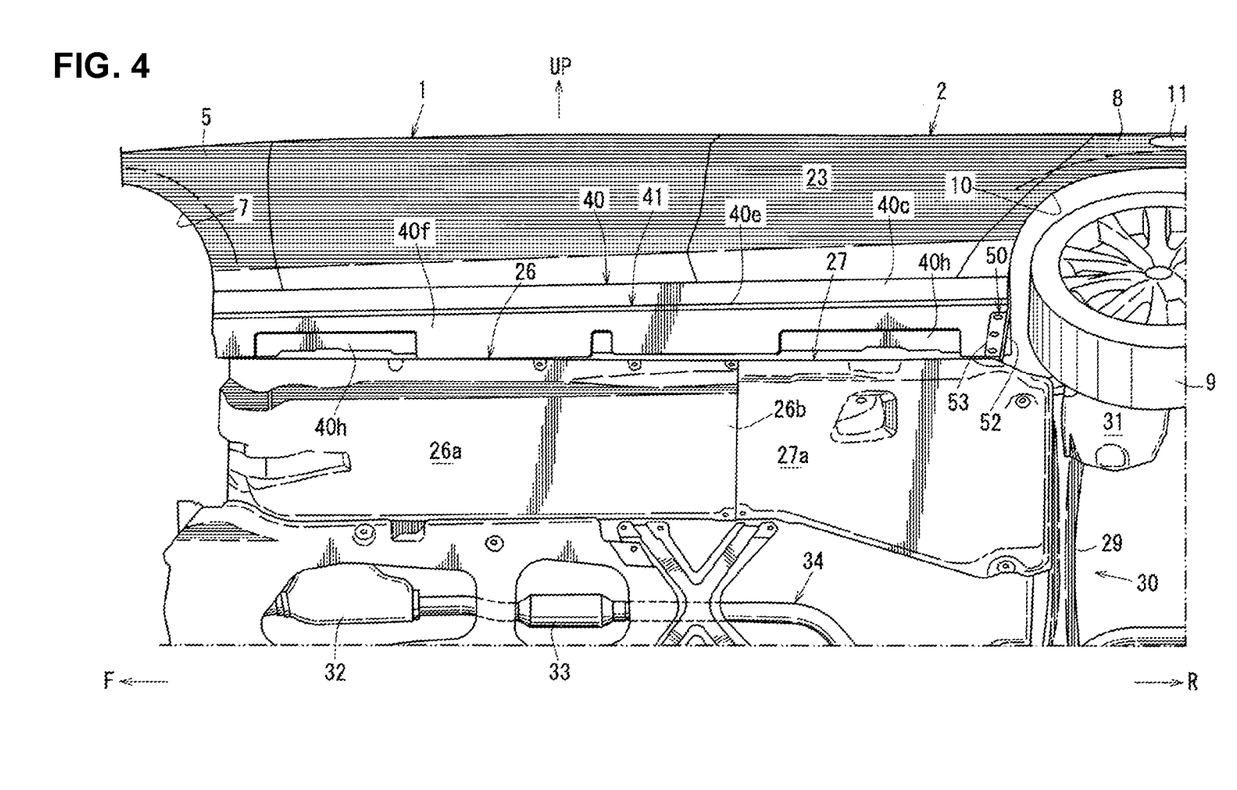
FIG. 4 is a perspective view of a bottom face of the major part of FIG. 1.

Figures show a vehicle-body side face structure. FIG. 1 is a side view of a vehicle provided with the vehicle-body side face structure, FIG. 2 is an enlarged perspective view of a major part of FIG. 1, FIG. 3 is a sectional perspective view taken along line A-A of FIG. 1, and FIG. 4 is a side view of a perspective view of a bottom face of the major part of FIG. 1.

Figure 2:
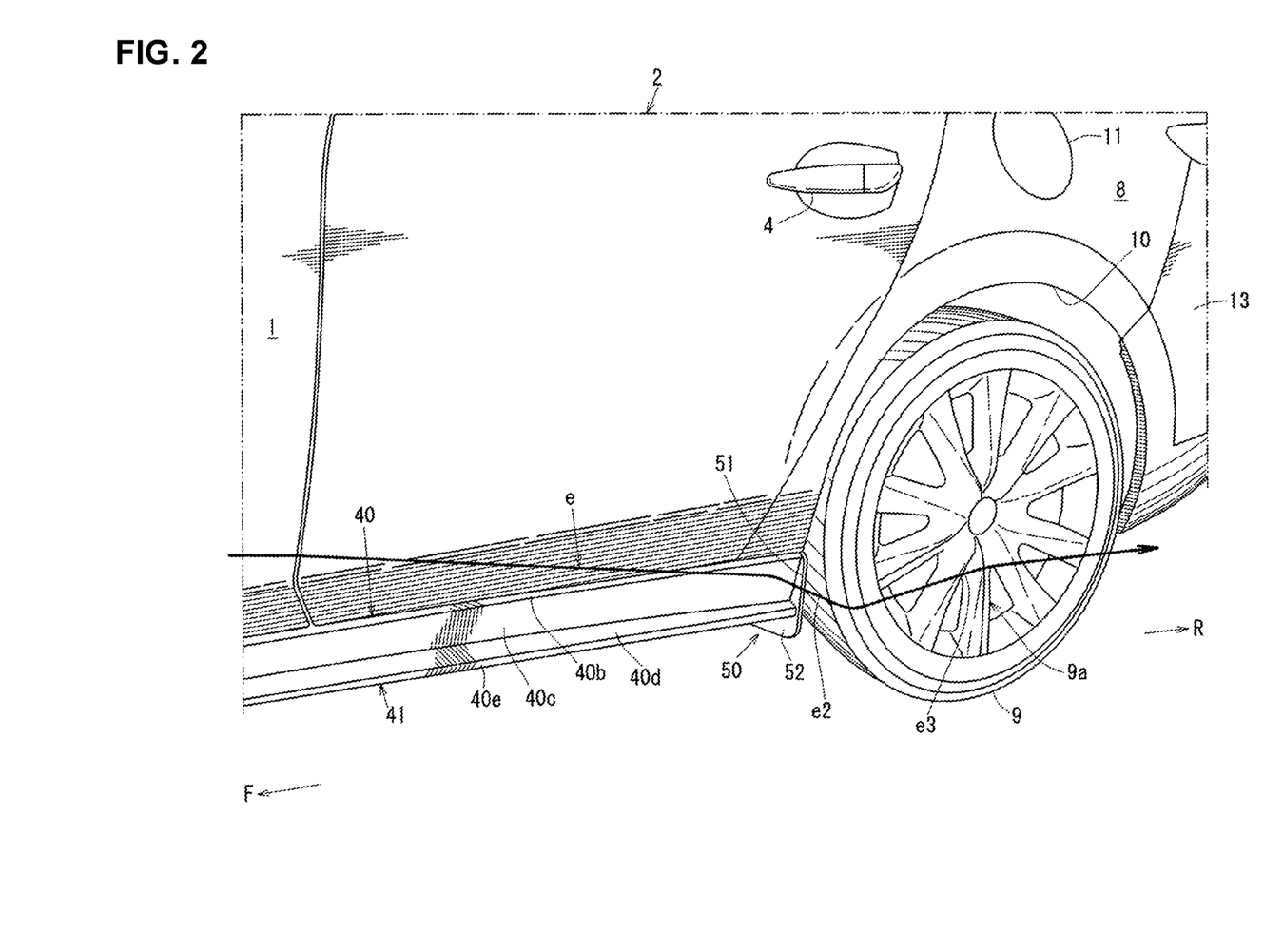
FIG. 2 is an enlarged perspective view of a major part of FIG. 1.

As shown in FIGS. 1 and 2, at a side portion of a vehicle body are provided a front door 1 as a side door which is configured to open or close a door opening formed at a vehicle front portion and a rear door 2 as another side door which is configured to open or close another door opening formed at a vehicle rear portion. The front door 1 is equipped with a door outer handle 3, and the rear door 2 is equipped with another door outer handle 4 similarly.

As shown in FIG. 1, a front fender panel 5 which covers a side of an engine room is provided in front of the front door 1, and a front wheel house 7 is integrally formed at a lower portion of the front fender panel 5 at a position corresponding to a front wheel 6.

As shown in FIG. 1, a rear fender panel 8 which covers a side of a baggage compartment is provided in back of the rear door 2, and a rear wheel house 10 is integrally formed at a lower portion of the rear fender panel 8 at a position corresponding to a rear wheel 9. A fuel rid 11 for fuel supply is attached to the rear fender panel 8. In FIG. 1, reference character 12 denotes a door mirror, and reference character 13 denotes a rear bumper face which is configured to extend rearwardly, going around a vehicle side portion.

As shown in FIG. 3, a floor panel 14 which forms a bottom face of a cabin is provided, and a pair of right-and-left side sills 15 which extend in a vehicle longitudinal direction at a lower portion of the cabin at a position between a lower end portion of a rear edge of the front wheel house 7 and a lower end portion of a front edge of the rear wheel house 10 are provided at right-and-left both end portions of the floor panel 14. Herein, a left-side side sill 15 is illustrated only in the figures.

As shown in FIG. 3, the side sill 15 is a vehicle-body reinforcing member having a side-sill closed cross section 18, which is formed by fixedly joining a side sill outer 16 and a side sill inner 17 and extends in the vehicle longitudinal direction. A center pillar 19 which extends in a vehicle vertical direction is provided at a position facing to a rear end portion of the front door 1 and a front end portion of the rear door 2.

As shown in FIG. 3, the center pillar 19 is a vehicle-body reinforcing member having a center-pillar closed cross section 22, which is formed by fixedly joining a center pillar outer 19 and a center pillar inner 21 and extends in the vehicle vertical direction, and a lower portion 20a of the center pillar outer 20 and a lower portion 21a of the center pillar inner 21 are fixed to an outward-side face portion of the side sill outer 16.

Meanwhile, as shown in FIG. 3, the rear side door 2 comprises a door outer panel 23 and a door inner panel 24, and a door inner space 25 is formed between the door outer panel 23 and the door inner panel 24.

As shown in FIG. 4, a front floor under cover 26 and a rear floor under cover 27, which serve as a member for airflow straightening, are provided at a side portion of a vehicle bottom portion which is positioned beside a tunnel portion such that these covers 26, 27 are continuous from each other in the vehicle longitudinal direction.

The floor under covers 26, 27 include flat airflow straitening faces 26a, 27a, respectively. Respective outward portions, in a vehicle width direction, of the floor under covers 26, 27, which are attached to a vehicle body, are attached to the side sill inner 17 by using attaching members 28, such as bolts and nuts, as shown in FIG. 3.

Specifically, a front end portion 27b of the rear floor under cover 27 is configured to overlap a rear end portion 26b of the front floor under cover 26 from above, and this overlap portion is fixedly fastened to a nut which is previously fixed to a roughly horizontal bottom portion of the side sill inner 17 by means of a bolt which is inserted from below.

As shown in FIG. 4, the vehicle of the present embodiment is provided with a torsion-beam type of rear suspension 30 which comprises a pair of right-and-left trailing arms extending in the longitudinal direction and a torsion beam 29 extending in the vehicle width direction and interconnecting the right-and-left trailing arms. A plate-shaped under cover 31 for airflow straightening is attached to a free-end-side lower portion of the trailing arm such that this under cover 31 covers this free-end-side lower portion from below. In FIG. 4, reference characters 32, 33 denote catalyst converters which are provided at a midway part of an exhaust pipe 34.

As shown in FIGS. 1 and 3, a garnish 40 is provided to cover the side sill 15 over a range from the front wheel house 7 to and the rear wheel house 10. This garnish 40 is provided with a protrusion portion 41 which protrudes outwardly, in the vehicle width direction, so as to suppress a side-face airflow flowing below a door maximum-width portion (see a beltline portion) of a side portion of the cabin from going around below a vehicle floor.

As shown in FIG. 3, the garnish 40 comprises an upper piece portion 40a which extends in the vertical direction, a roughly-horizontal portion 40b which roughly horizontally extends outwardly, in the vehicle width direction, from a lower end of the upper piece portion 40a, a vertical face portion 40c which extends obliquely inwardly and downwardly from an outward side of the roughly-horizontal portion 40b and extends in the vehicle longitudinal direction along a lower portion of the rear door 2 and an outer face of the side sill 15, a protruding face portion 40d which protrudes outwardly from a lower end of the vertical wall portion 40c and forms an upper face of the protrusion portion 41, an outer piece portion 40e which extends downwardly from an outward end of the protruding face portion 40d, and a bottom face portion 40f which extends inwardly, in the vehicle width direction, from a lower end of the outer piece portion 40e and forms a lower face of the protruding portion 41.

A synthetic-resin-made attaching piece portion 40g is integrally formed at the garnish 40 such that this attaching piece portion 40 extends vertically between a lower portion of the upper piece portion 40a and a middle portion, in the vertical direction, of the vertical face portion 40c on an inward side, in the vehicle width direction, of the garnish 40. As shown in FIG. 3, the attaching piece portion 40g is attached to the center pillar outer 20 by means of clips 42, whereby the garnish 40 is attached to the vehicle body. Herein, a part of the attaching piece portion 40g is illustrated in FIG. 3, but there exist plural attachment points with the clips 42 along the longitudinal direction.

Figure 8:
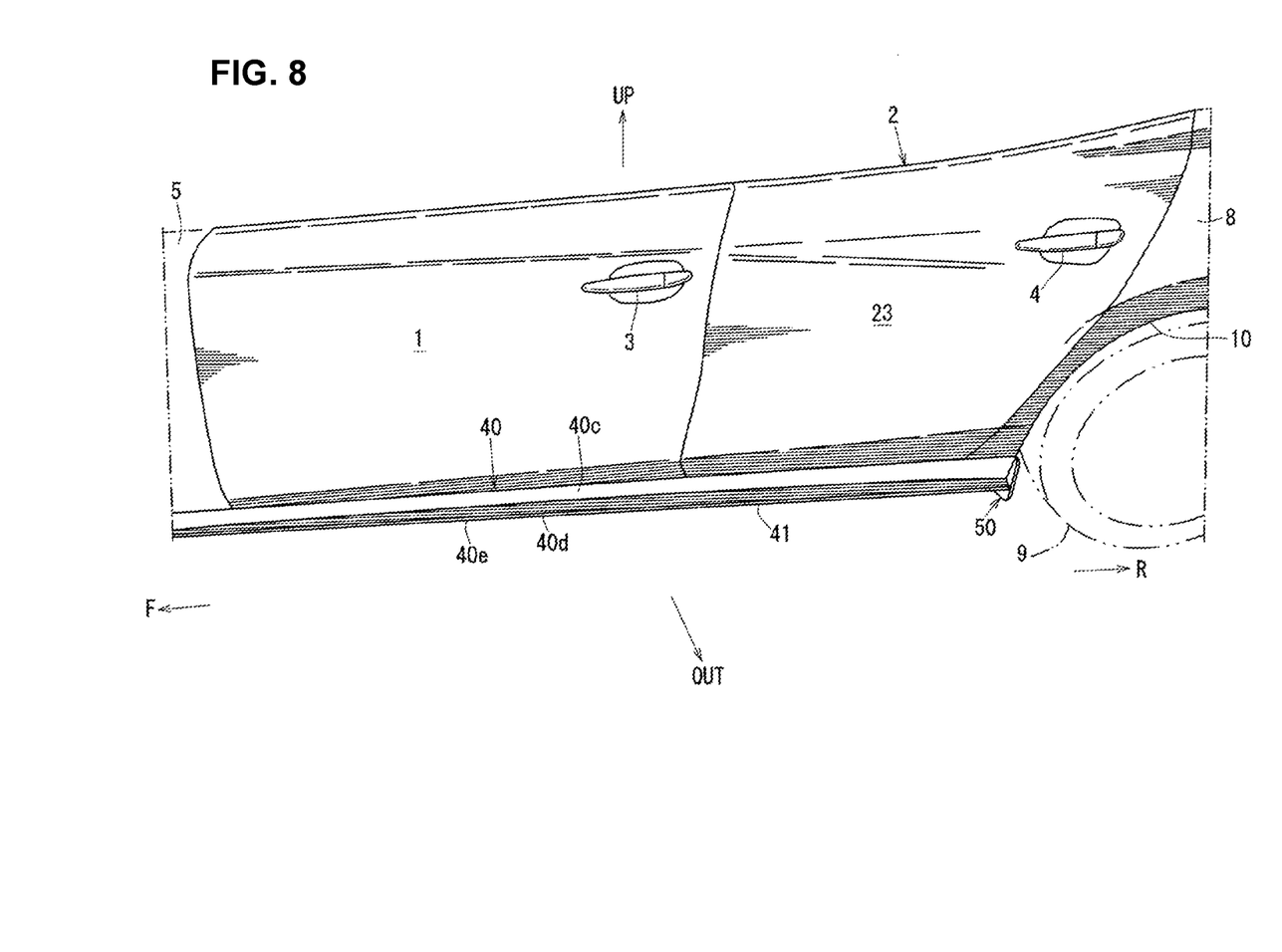
FIG. 8 is a partial perspective view showing a linear shape and a curved shape of the garnish.

FIG. 8 is a partial perspective view showing a linear shape and a curved shape of the garnish 40, and as shown in this figure, an outward end, in the vehicle width direction, of the protruding face portion 40d is configured to be linear over a range from the lower end of the rear edge of the front wheel house 7 to the lower end portion of the front edge of the rear wheel house 10. In other words, the outer piece portion 40e of the garnish 40 is configured to be linear over the range from the lower end of the rear edge of the front wheel house 7 to the lower end portion of the front edge of the rear wheel house 10.

Further, as shown in FIG. 8, an inward end, in the vehicle width direction, of the protruding face portion 40d and the vertical face portion 40c are configured to be curved such that respective middle portions, in the vehicle longitudinal direction, thereof are positioned inwardly in the vehicle width direction, which match a shape of a lower portion of the front door 1 and a shape of a lower portion of the rear door 2, respectively.

Thereby, the side-face airflow flowing below the door maximum-width portion is suppressed from going around below the vehicle floor by means of the protruding face portion 40d which forms the upper face of the protrusion portion 41, thereby securing the airflow straightening effect, and also the vehicle design quality is secured by the curved shapes of the inward end of the protruding face portion 40d and the vertical face portion 40c.

Figure 5:
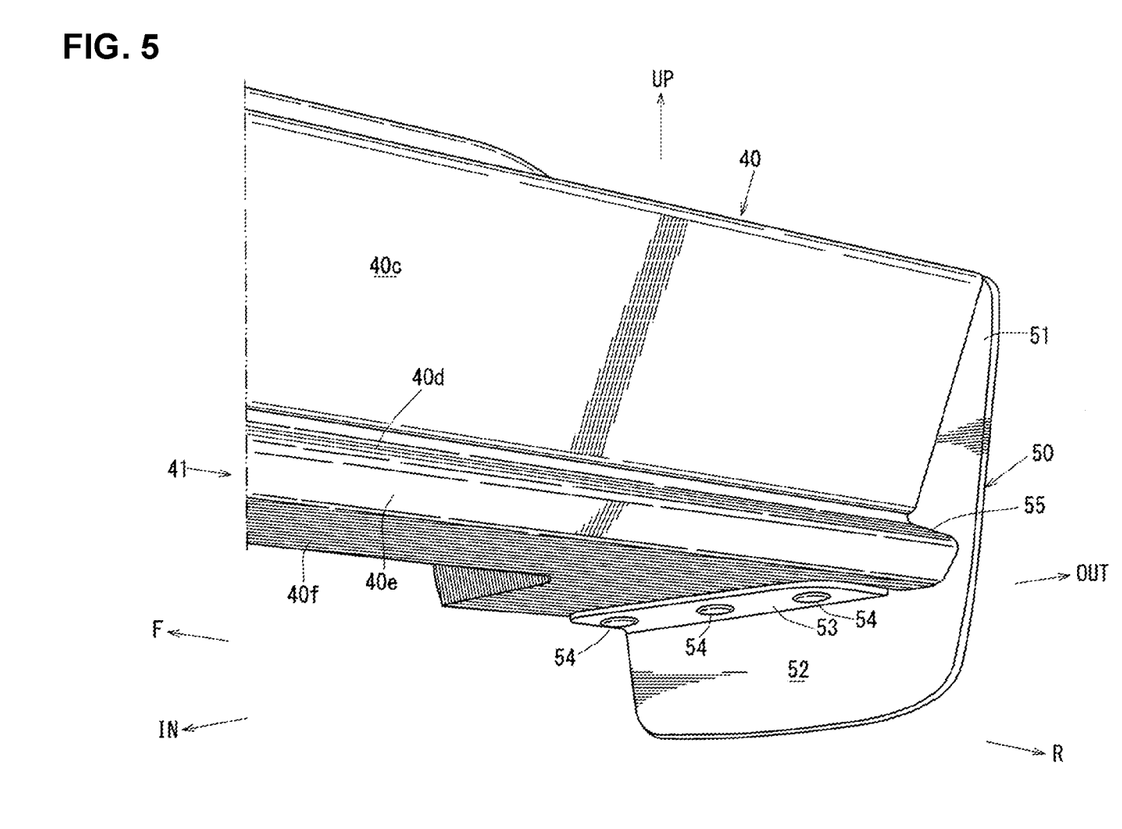
FIG. 5 is a perspective view of a garnish and a tire deflector.
Figure 6:
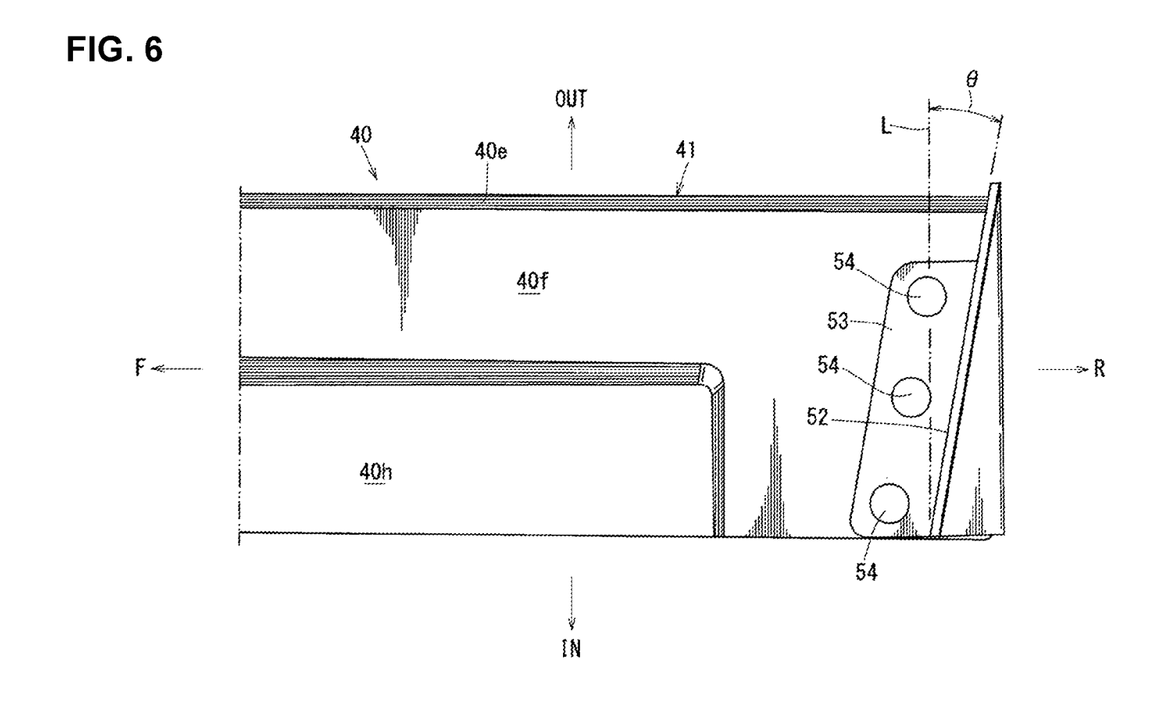
FIG. 6 is a bottom face view of FIG. 5.
Figure 7:
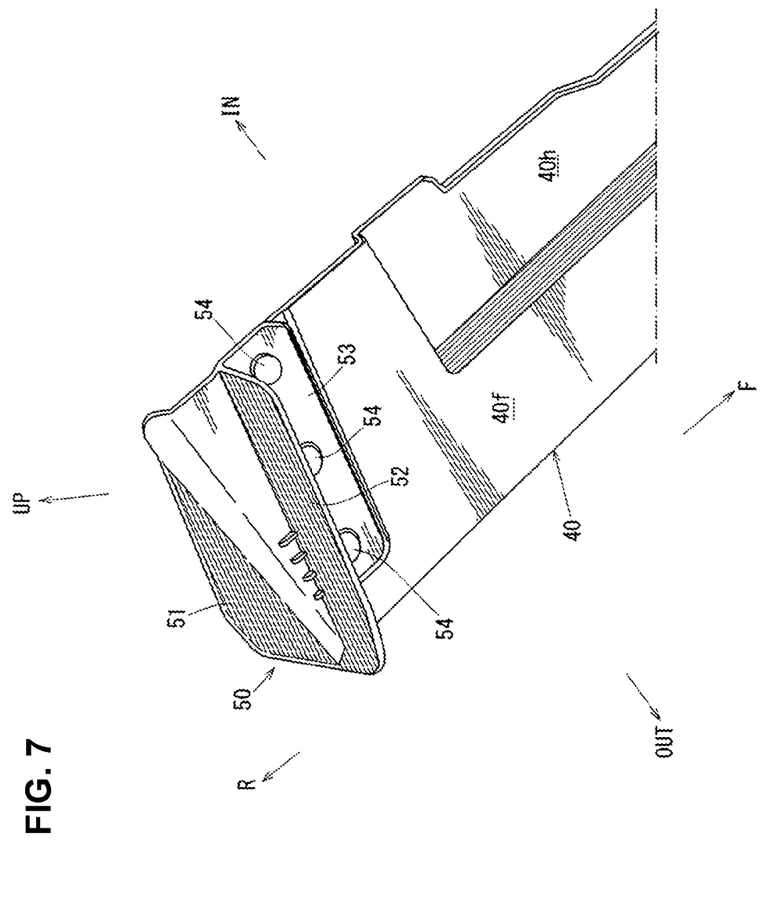
FIG. 7 is a perspective view of the garnish and the tire deflector.

FIG. 5 is a perspective view of the garnish and a tire deflator, FIG. 6 is a bottom face view of FIG. 6, and FIG. 7 is a perspective view of the garnish and the tire deflator. As shown in FIGS. 2-8, a plate-shaped tire deflector 50 is provided at the lower end portion of the front edge of the rear wheel house 10 which corresponds to a position, in the vertical direction, of a rear end portion of the protrusion portion 41 of the garnish 40.

The tire deflector 50 is a traveling-air deflecting means for deflecting a side-face airflow e which flows above the protrusion portion 41 of the garnish 40 (see a bold arrow in FIG. 2) such that this airflow e is turned toward an outward side, in the vehicle width direction, so as not to flow into the rear wheel house 10 (see a bold arrow e2 part) and adheres to an outer face 9a of a tire wheel of the rear wheel 9 (see a bold arrow e3 part).

The tire deflector 50 comprises, as shown in FIG. 5, a upper-side plate-shaped portion 51 which is positioned above a rear end of the outer piece portion 40e of the garnish 40, a lower-side plate-shaped portion 52 which is positioned below the rear end of the outer piece portion 40e and extends downwardly from a lower face portion of the side sill 15, and a attaching piece portion 53 (a so-called attachment base) which extends forwardly from an upper portion of the lower-side plate-shaped portion 52 so as to match the bottom face portion 40f of the garnish 40, which are integrally made of synthetic resin, such as polypropylene.

As shown in FIGS. 5, 6 and 7, the attaching piece portion 53 of the tire deflector 50 is fixedly attached to the bottom face portion 40f of the garnish 40 by using plural clips 54.

As shown in the bottom view of FIG. 6, the lower-side plate-shaped portion 52 is provided to be inclined such that an outward end, in the vehicle width direction, thereof is positioned on a rearward side, in the vehicle longitudinal direction, of an inward end, in the vehicle width direction, thereof. As shown in FIGS. 2 and 5, a portion of the upper-side plate-shaped portion 51 which protrudes toward the outward side, in the vehicle width direction, beyond the garnish 40 is provided to be inclined similarly.

As shown in FIG. 6, an inclined angle θ relative to a vehicle-width-direction line L of the plate-shaped portions 51, 52 is set within a range of 8-12 degrees, preferably set at about 10 degrees. Thereby, the above-described side face airflow is made to adhere to the outer face 9a of the tire wheel securely.

Further, as shown in FIG. 5, the tire deflector 50 is configured to abut with and be fixed to a rear end face of the garnish 40. Thereby, positioning of the both members 40, 50 is attained merely by making the deflector 50 abut with the rear end face of the garnish 40, so that the assembling quality of the tire deflector 50 to the garnish 40 is improved.

Herein, upwardly-recced attachment seats 40h for attaching the garnish 40 to a lower face of the side sill 15 are formed at respective portions of the bottom face portion 40f of the garnish 40 which are positioned at an inward side, in the vehicle width direction, of the bottom face portion 40f and spaced apart from each other in the vehicle longitudinal direction. Since the attachment seats 40h are configured to be recessed upwardly from the bottom face portion 40f of the garnish 40, it is prevented that the airflow flowing below the garnish 40 is disturbed by attaching members which attach the garnish attachment seats 40h to the side sill 15.

Herein, while the above-described embodiment shows a left-side vehicle structure, the vehicle-body side structure is symmetrical laterally substantially. In the figures, an arrow F shows a vehicle forward side, an arrow R shows a vehicle rearward side, an arrow IN shows in an inward side, in the vehicle width direction, of the vehicle, an arrow OUT shows an outward side, in the vehicle width direction, of the vehicle, and arrow UP shows a vehicle upward side.

As described above, the vehicle-body side face structure of the present embodiment comprises the side sill 15 extending in the vehicle longitudinal direction at the lower portion of the cabin at the position located between the lower end portion of the rear edge of the front wheel house 7 and the lower end portion of the front edge of the rear wheel house 10, and the garnish 40 provided to cover the side sill 15 over the range from the front wheel house 7 to the rear wheel house 10, wherein the garnish 40 is provided with the protrusion portion 41 which protrudes outwardly, in the vehicle width direction, so as to suppress the side-face airflow e flowing below the door maximum-width portion of the side portion of the cabin from going around below the vehicle floor, and the plate-shaped tire deflector 50 is provided at the lower end portion of the front edge of the rear wheel house 10 which corresponds to the position, in the vertical direction, of the rear end portion of the protrusion portion 41 of the garnish 40, the tire deflector 50 being configured to deflect the side-face airflow flowing above the protrusion portion 41 such that the side-face airflow is turned toward the outward side, in the vehicle width direction, so as not to flow into the rear wheel house 10 and adheres to the outer face 9a of the tire wheel of the rear wheel 9 (see FIGS. 1-3).

According to the present structure, the side-face airflow flowing below the door maximum-width portion of the side portion of the cabin can be properly suppressed from going around below the vehicle floor by means of the above-described protrusion portion 41, and also the situation where the above-described side-face airflow e is deflected upwardly and becomes so strong that it flows into the rear wheel house 10 can be properly suppressed by means of the above-described tire deflector 50, thereby reducing disturbance of the vehicle rear airflow properly.

In the embodiment of the present invention, the garnish 40 comprises the vertical face portion 40c which extends in the vehicle longitudinal direction along the lower portion of the door and the outer face of the side sill 15 and the protruding face portion 40d which protrudes outwardly, in the vehicle width direction, of the vertical face portion 40c and forms the upper face of the protrusion portion 41, the outward end, in the vehicle width direction, of the protruding face portion 40d is configured to be linear over the range from the lower end portion of the rear edge of the front wheel house 7 and to the lower end portion of the front edge of the rear wheel house 10, and the inward end, in the vehicle width direction, of the protruding face portion 40d and the vertical face portion 40c are configured to be curved such that the respective middle portions, in the vehicle longitudinal direction, thereof are curved inwardly, in the vehicle width direction, so as to correspond to the shape of the lower portion of the door (see FIG. 8).

According to this structure, the side-face airflow flowing below the door maximum-width portion can be properly suppressed from going around below the vehicle floor by means of the protruding face portion 40d forming the upper face of the protrusion portion 41, thereby properly securing the airflow straightening effect, and also the vehicle design quality can be properly secured by the curved shapes of the inward end of the protruding face portion 40d and the vertical face portion 40c.

In the embodiment of the present invention, the tire deflector 50 includes the plate-shaped portion (see the lower-side plate-shaped portion 52) which is configured to extend downwardly from the lower face of the side sill 15, this plate-shaped portion 52 is inclined such that the outward end, in the vehicle width direction, thereof is positioned on the rearward side, in the vehicle longitudinal direction, of the inward end, in the vehicle width direction, thereof (see FIG. 6).

According to this structure, since the plate-shaped portion (the lower-side plate-shaped portion 52) of the tire deflector 50 is arranged in the so-called rearwardly inclined state, the side-face airflow can be made to adhere to the outer face 9a of the tire wheel securely.

In the embodiment of the present invention, the tire deflector 50 is configured to abut with and be fixed to the rear end face of the garnish 40 (see FIG. 5).

According to this structure, the assembling quality of the tire deflector 50 to the garnish 40 can be properly improved.

In correspondence of the present invention to the above-described embodiment, the plate-shaped portion of the present invention corresponds to the lower-side plate-shaped portion 52 of the embodiment. However, the present invention is not limited to the above-described embodiment only.

What is claimed is:

1. A vehicle-body side face structure, comprising:
 a side sill extending in a vehicle longitudinal direction at a lower portion of a cabin at a position located between a lower end portion of a rear edge of a front wheel house and a lower end portion of a front edge of a rear wheel house; and
 a garnish provided to cover the side sill over a range from the front wheel house to the rear wheel house,
 wherein said garnish is provided with a protrusion portion which protrudes outwardly, in a vehicle width direction, so as to suppress a side-face airflow flowing below a door maximum-width portion of a side portion of the cabin from going around below a vehicle floor, and
 a plate-shaped tire deflector is provided at said lower end portion of the front edge of the rear wheel house which corresponds to a position, in a vertical direction, of a rear end portion of said protrusion portion of the garnish, the tire deflector being configured to deflect a side-face airflow flowing above the protrusion portion such that the side-face airflow is turned toward an outward side, in the vehicle width direction, so as not to flow into the rear wheel house and adheres to an outer face of a tire wheel of a rear wheel,
 wherein the tire deflector includes a plate-shaped portion which extends substantially along the vehicle width direction.

2. The vehicle-body side face structure of claim 1, wherein said garnish comprises a vertical face portion which extends in the vehicle longitudinal direction along a lower portion of a door and an outer face of said side sill and a protruding face portion which protrudes outwardly, in the vehicle width direction, of said vertical face portion and forms an upper face of said protrusion portion, an outward end, in the vehicle width direction, of said protruding face portion is configured to be linear over a range from the lower end portion of the rear edge of the front wheel house and to the lower end portion of the front edge of the rear wheel house, and an inward end, in the vehicle width direction, of said protruding face portion and said vertical face portion are configured to be curved such that respective middle portions, in the vehicle longitudinal direction, thereof are curved inwardly, in the vehicle width direction, so as to correspond to a shape of the lower portion of the door.

3. The vehicle-body side face structure of claim 2, wherein said tire deflector includes a plate-shaped portion which is configured to extend downwardly from a lower face of said side sill, the plate-shaped portion is inclined such that an outward end, in the vehicle width direction, thereof is positioned on a rearward side, in the vehicle longitudinal direction, of an inward end, in the vehicle width direction, thereof.

4. The vehicle-body side face structure of claim 3, wherein said tire deflector is a separable member from said garnish and said tire deflector is configured to abut with and be fixed to a rear end face of said garnish.

5. The vehicle-body side face structure of claim 2, wherein said tire deflector is a separable member from said garnish and said tire deflector is configured to abut with and be fixed to a rear end face of said garnish.

6. The vehicle-body side face structure of claim 1, wherein said tire deflector includes a plate-shaped portion which is configured to extend downwardly from a lower face of said side sill, the plate-shaped portion is inclined such that an outward end, in the vehicle width direction, thereof is positioned on a rearward side, in the vehicle longitudinal direction, of an inward end, in the vehicle width direction, thereof.

7. The vehicle-body side face structure of claim 6, wherein said tire deflector is a separable member from said garnish and said tire deflector is configured to abut with and be fixed to a rear end face of said garnish.

8. The vehicle-body side face structure of claim 1, wherein said tire deflector is a separable member from said garnish and said tire deflector is configured to abut with and be fixed to a rear end face of said garnish.

9. The vehicle-body side face structure of claim 1, wherein said tire deflector includes the plate-shaped portion and an attaching piece portion which extends forwardly in the vehicle longitudinal direction from the plate portion;
the plate-shaped portion abuts against a rear end portion of the garnish; and the attaching portion is fixedly attached to the rear end portion of the garnish.

10. The vehicle-body side face structure of claim 1, wherein an inclination angle of the extending direction of the plate-shaped portion is set within 8-12 degrees relative to the vehicle width direction.

11. A vehicle-body side face structure, comprising:
a side sill extending in a vehicle longitudinal direction at a lower portion of a cabin at a position located between a lower end portion of a rear edge of a front wheel house and a lower end portion of a front edge of a rear wheel house; and
a garnish provided to cover the side sill over a range from the front wheel house to the rear wheel house,
wherein said garnish includes an upwardly extending wall portion, a protruding face portion which protrudes outwardly in a vehicle width direction from a lower end of the upwardly extending wall portion, an outer piece portion which extends downwardly from an outward end of the protruding face portion, and a bottom face portion which extends inwardly in the vehicle width direction from a lower end of the outer piece portion;
wherein a protrusion portion is formed by the protruding face portion, the outer piece portion and the bottom face portion, wherein a dimension of the outer piece portion in a vertical direction is smaller than a dimension of the protrusion face portion in the vehicle width direction; and the protrusion portion protrudes outwardly in the vehicle width direction so as to suppress a side-face airflow flowing below a door maximum-width portion of a side portion of the cabin from going around below a vehicle floor, and
a plate-shaped tire deflector is provided at said lower end portion of the front edge of the rear wheel house which corresponds to a position, in the vertical direction, of a rear end portion of said protrusion portion of the garnish, the tire deflector being configured to deflect a side-face airflow flowing above the protrusion portion such that the side-face airflow is turned toward an outward side, in the vehicle width direction, so as not to flow into the rear wheel house and adheres to an outer face of a tire wheel of a rear wheel.

12. The vehicle-body side face structure of claim 11, wherein said tire deflector includes the plate-shaped portion and an attaching piece portion which extends forwardly in the vehicle longitudinal direction from the plate portion;
the plate-shaped portion abuts against a rear end portion of the garnish; and the attaching portion is fixedly attached to the bottom face portion of the garnish.

* * * * *